United States Patent
Tsi et al.

(10) Patent No.: US 6,213,399 B1
(45) Date of Patent: *Apr. 10, 2001

(54) MULTI-CHANNEL SIGNAL PROCESSING IN AN OPTICAL READER

(75) Inventors: David Tsi, Stony Brook; Mark Kricehever, Hauppauge; Edward Barkan, Miller Place, all of NY (US)

(73) Assignee: Symbol Technologies, Inc., Holtsville, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/598,928

(22) Filed: Feb. 9, 1996

Related U.S. Application Data

(60) Continuation-in-part of application No. 08/314,519, filed on Sep. 28, 1994, now Pat. No. 5,506,392, which is a division of application No. 08/109,021, filed on Aug. 19, 1993, now Pat. No. 5,352,922, which is a division of application No. 07/735,573, filed on Jul. 25, 1991, now Pat. No. 5,278,397.

(51) Int. Cl.[7] .............................. G06K 5/04; G06K 7/10; G06K 9/32

(52) U.S. Cl. ............................ 235/462.08; 235/462.22; 235/462.45

(58) Field of Search ..................................... 235/472, 462, 235/454, 472.01, 462.45, 462.41, 462.23, 462.24, 462.25, 462.22, 462.08, 467.09

(56) References Cited

U.S. PATENT DOCUMENTS

| | | | |
|---|---|---|---|
| 3,381,133 | 4/1968 | Barnes et al. | 257/459 |
| 3,684,868 | 8/1972 | Christie et al. | 250/219 |
| 3,716,699 | 2/1973 | Eckert et al. | 235/463 |
| 3,727,030 | 4/1973 | McMurtry | 250/219 |
| 3,758,782 | 9/1973 | Radford et al. | 250/239 |
| 3,784,794 | 1/1974 | Allais | 235/61.11 E |
| 3,789,361 | * 1/1974 | Cortez | 340/146.3 |

(List continued on next page.)

FOREIGN PATENT DOCUMENTS

| | | | |
|---|---|---|---|
| 220482 | 9/1986 | (JP) | 257/459 |
| 182874 | 7/1988 | (JP) | 257/465 |
| 224268 | 9/1988 | (JP) | 257/459 |

OTHER PUBLICATIONS

Metlitsky, B., *Laser Bar Code Scanning: A System Design and Analysis Model*, Symbol Technologies, Inc. publication, Jul. 1990.

*Bar Code System Considerations*, Symbol Technologies, Inc. publication, Dec. 1989.

"SFH 204 Silicon Four Quadrant Photodiode," Siemens publication, pp. 8–44 and 8–45, undated.

"PBX 48 Differential Photodiode," Siemens publication, pp. 8–20 and 8–21, undated.

Symbol Technologies, Inc., "SDT: New Scanning Data Terminal—Supports Both Bar Code Reading and Manual Data Entry," *Symbol MSI*, Part 789 MX, 1989.

*Primary Examiner*—Karl D. Frech
(74) *Attorney, Agent, or Firm*—Fish & Richardson P.C.

(57) ABSTRACT

A light source and a light detector are included in an optical reader such as a field of view reader or a flying spot scanner for reading a printed indicia such as a bar code symbol. At least two channels associated with the detector carry signals corresponding to light detected by the detector at different resolution levels, allowing a single reader to be used for different resolution levels of the indicia to be read.

19 Claims, 7 Drawing Sheets

U.S. PATENT DOCUMENTS

| | | | |
|---|---|---|---|
| 3,809,893 | 5/1974 | Dobras | 250/227 |
| 3,818,444 * | 6/1974 | Connell | 235/467 |
| 3,916,184 | 10/1975 | Turner et al. | 250/227 |
| 3,985,999 | 10/1976 | Yoneyama | 235/61.11 E |
| 4,013,367 * | 3/1977 | Nagao et al. | 356/200 |
| 4,013,893 | 3/1977 | Hertig | 250/568 |
| 4,115,703 | 9/1978 | Dobras | 250/568 |
| 4,127,932 | 12/1978 | Hartman et al. | 257/459 |
| 4,143,809 | 3/1979 | Uebbing et al. | 235/462 |
| 4,312,114 | 1/1982 | Schoolar | 257/459 |
| 4,367,009 * | 1/1983 | Suzki | 350/6.5 |
| 4,473,746 * | 9/1984 | Edmonds | 250/216 |
| 4,675,531 | 6/1987 | Clark et al. | 250/568 |
| 4,798,943 * | 1/1989 | Cherry | 235/463 |
| 4,831,275 | 5/1989 | Drucker | 235/472 |
| 4,882,478 | 11/1989 | Hayashi et al. | 250/211 R |
| 4,908,813 * | 3/1990 | Ojima et al. | 369/94 |
| 4,963,756 | 10/1990 | Quan et al. | 235/472 |
| 4,973,829 * | 11/1990 | Ishida et al. | 235/462 |
| 4,983,817 * | 1/1991 | Dolash et al. | 235/462 |
| 5,045,677 * | 9/1991 | Okamura | 235/462 |
| 5,051,567 | 9/1991 | Tedesco | 235/462 |
| 5,122,644 | 6/1992 | Hasegawa et al. | 235/472 |
| 5,136,147 | 8/1992 | Metlitsky et al. | 235/472 |
| 5,140,142 | 8/1992 | Atsushi | 235/472 |
| 5,164,581 | 11/1992 | Shiga | 250/208.6 |
| 5,278,397 | 1/1994 | Barkan et al. | 235/462 |
| 5,352,922 | 10/1994 | Barkan et al. | 257/459 |
| 5,506,392 | 4/1996 | Barkan et al. | 235/472 |

* cited by examiner

D1 - ACTIVE AREA #1
D2 - ACTIVE AREA #2

MULTI-CHANNEL SIGNAL PROCESSING IN AN OPTICAL READER

REFERENCE TO RELATED APPLICATIONS

This application is a continuation-in-part of Ser. No. 08/314,519, filed Sep. 28, 1994, now U.S. Pat. No. 5,506,392, which was a division of Ser. No. 08/109,021, filed Aug. 19, 1993, now U.S. Pat. No. 5,352,922, which was a division of Ser. No. 07/735,573 filed Jul. 25, 1991, now U.S. Pat. No. 5,278,397.

BACKGROUND OF THE INVENTION

Field of the Invention

The invention relates to an optical reader including a multi-channel detector.

Various readers and optical scanning systems have been developed for reading printed indicia such as bar code symbols appearing on a label or the surface of an article and providing information concerning the article such as the price or nature of the article. The bar code symbol itself is a coded pattern of indicia comprised of, for example, a series of bars of various widths spaced apart from one another to form spaces of various widths, the bars and spaces having different light reflecting characteristics. The readers electro-optically transform the graphic indicia into electrical signals which are decoded into alpha-numeric characters that are intended to be descriptive of the article or a characteristic thereof. Such characters typically are represented in digital form, and utilised as an input to a data processing system for applications in point of sale processing, inventory control and the like.

Known scanning systems comprise a light source for generating a light beam incident on a bar code symbol and a light receiver for receiving the reflected light and decoding the information contained in the bar code symbol accordingly. The readers may comprise a flying spot scanning system wherein the light beam is scanned rapidly across a bar code symbol to be read or a fixed field of view reading system wherein the bar code symbol to be read is illuminated as a whole and a CCD (Charge Coupled Device) array is provided for detecting the light reflected from the bar code symbol. The reader may be either a hand-held device or a surface-mounted fixed terminal.

A variety of scanning devices are known. The scanner could be a wand type reader including an emitter and a detector fixedly mounted in the wand, in which case the user manually moves the wand across the symbol. Alternatively, an optical scanner scans a light beam such as a laser beam across the symbol, and a detector senses the light reflected from the symbol. Alternatively a gun-type hand-held arrangement may be provided. In either case, the detector senses reflected light from a spot scanned across the symbol, and the detector provides the analog scan signal representing the encoded information.

A digitizer processes the analog signal to produce a pulse signal where the widths and spacings between the pulses correspond to the widths of the bars and the spacings between the bars. The digitizer serves as an edge detector or wave shaper circuit, and the threshold value set by the digitizer determines what points of the analog signal represent bar edges. The threshold level effectively defines what portions of a signal the reader will recognize as a bar or a space.

Readers of the type discussed above are single channel systems having a single digitizer output and/or a single processing chain to produce a single digitized output.

The pulse signal from the digitizer is applied to a decoder. The decoder first determines the pulse widths and spacings of the signal from the digitizer. The decoder then analyses the widths and spacings to find and decode a legitimate bar code message. This includes analysis to recognize legitimate characters and sequences, as defined by the appropriate code standard. This may also include an initial recognition of the particular standard the scanned symbol conforms to. The recognition of the standard is typically referred to as auto discrimination.

Different bar codes have different information densities and contain a different number of elements in a given area representing different amounts of encoded data. The denser the code, the smaller the elements and spacings. Printing of the denser symbols on a appropriate medium is exacting and thus is more expensive than printing low resolution symbols.

A bar code reader typically will have a specified resolution, often expressed by the size of its effective sensing spot. The resolution of the reader is established by parameters of the emitter or the detector, by lenses or apertures associated with either the emitter or the detector, by the threshold level of the digitizer, by programming in the decoder, or by a combination of two or more of these elements.

In a laser beam scanner the effective sensing spot may correspond to the size of the beam at the point it impinges on the bar code. In a scanner using an LED or the like, the spot size can be the illuminated area, or the spot size can be that portion of the illuminated area from which the detector effectively senses light reflections. By what ever means the spot size is set for a particular reader, the photodetector will effectively average the light detected over the area of the sensing spot.

A high resolution reader has a small spot size and can decode high density symbols. The high resolution reader, however, may have trouble accurately reading low density symbols because of the lower quality printing used for such symbols. This is particularly true of dot matrix type printed symbols. The high resolution reader may actually sense dot widths within a bar as individual bar elements. In contrast, a low resolution reader has a large spot size and can decode low density symbols. However, a reader for relatively noisy symbols such as dot matrix symbols reads such a wide spot that two or more fine bars of a high resolution symbol may be within the spot at the same time. Consequently, a reader having a low resolution, compatible with dot matrix symbols can not accurately read high density symbols. Thus any reader having a fixed resolution will be capable of reading bar codes only within a limited range of symbol densities.

For a given symbol density, the resolution of the reader also limits the range of the working angle, i.e. the angle between the axis of the reader and a line normal to of the surface on which the bar code is printed. If the range and resolution are too limited, a user may have difficulty holding a hand-held reader comfortably while accurately scanning the bar code. This can be particularly troublesome if the reader incorporates additional elements to form an integrated data terminal. The combination of size, weight and an uncomfortable angle can make reading in large amounts of bar code information difficult and annoying, and thereby make the user more resistant to use of the bar code system. Problems also arise with fixed readers which may have to be manually switched dependent on the resolution required, reducing efficiency and slowing operation of the system.

One solution might be to provide some means to adjust the resolution or sensing spot size of the reader, e.g., by adjusting the threshold of the digitizer. This approach, however, would require a number of different scans at different resolutions. If the scan is automatic, the variation in resolution causes a loss of robustness because the scan is at the correct resolution only a reduced amount of the time. Effectively such a scanner would scan at the equivalent of a reduced rate. If the reader is a hand-held device, the user would have to manually scan the reader across the information each time the resolution changes. This causes a marked reduction in the first read rate and increased frustration for the user.

In addition most optical scanners such as bar code scanners are adapted for use at a particular distance, or a range of distances, from an indicia to be scanned. If the user holds the scanner too close to the indicia, (or, conversely the object is held too close to the scanner) or too far away, the indicia and/or the flying spot beam will not be in focus, and decoded will not be possible.

Such scanners may not be particularly convenient in environments where a series of indicia to be read are presented to the scanner at various distances, and where it is difficult or impossible for the user to alter the distance between the scanner and the indicia. To deal with such situations, attempts have been made to expand the acceptable working range of conventional scanners, to give the user as much leeway as possible, and also to provide multi-distance scanners which can operate, for example, at a first working range or at a second working range according to the user's preference or requirements. One possibility is for the provision of a two-position switch on the scanner, with the scanner operating at a first working distance in a first position of the switch and at a second working distance in a second position.

An improved solution is to provide an optical scanner including a multi-surface reflector having a first surface of a first profile and a second surface of a second profile, the scanner being adapted to read an indicia at a first distance or working range when the beam is reflected from the first surface and at a second distance or working range when the beam is reflected from the second surface.

A further problem associated with conventional methods of signal processing is that the analog signal is processed only once and the decodeability of the processed signal is principally determined by the signal to noise ratio of the incoming signal.

In addition known digitizers have been recognised as requiring improvement in the scanning of dot matrix symbols such as bar code symbols printed in dot matrix format. The failure to decode such symbols is commonly caused by a split in a wide bar wherein a void in the bar causes a narrow element to appear in the middle of the bar. This only happens in the case of wide bars because such bars are built up of two or three columns of dots and small spaces between the columns are sometimes large enough to be recognised and digitized as wide elements.

It will be appreciated that the problem does not arise with narrow bars made up a single column of dots.

SUMMARY OF THE INVENTION

Objects of the Invention

It is an object of the present invention at least to alleviate the problems of the prior art. It is a further object to provide a reader allowing improved reading of printed indicia at multiple resolutions.

It is a further object still of the present invention to provide improved reading of printed indicia presented at various distances from the reader.

It is still a further object of the invention to provide an optical reader having an improved signal to noise ratio.

It is yet a further object of the invention to provide further improved reading of dot matrix symbols such as bar code symbols.

Features of the Present Invention

According to the invention there is provided an optical reader for generating an outgoing light beam to illuminate an information symbol comprising regions of different light reflectivity, and for collecting an incoming light beam reflected from the symbol, the reader comprising:

a source of the outgoing light beam;

light collection optics for collecting the incoming light beam and for directing the incoming light beam to a multi-channel photodetector;

the multi-channel photodetector comprising an array of more than one individual active optical sensing element, each said element having an output capable of providing an output signal representative of light impinging thereon;

the output of each detection element being coupled to a respective channel for processing the output signal of a respective detection element. Because a plurality of channels are involved, improved coupling out of signals at each channel is achieved. This is of particular advantage when it is desired to convey different signal information in each channel.

One of the active optical sensing elements may be positioned around another of the active optical sensing elements. Preferably the outgoing light beam, light collection optics, and array of sensing elements are configured so that the output of a first group of the sensing elements corresponds to a spot of a first size passing across the information symbol, and so that the output of a second group of the sensing elements corresponds to a spot of second size, larger than said first size, passing across the information symbol. Accordingly each channel will transfer a signal at a different resolution level.

The array of sensing elements may comprise a first and a second sensing element, and the first sensing element may be contained within the first group and the first and the second elements are contained within the second group. The first group may contain only the first sensing element, and the second group may contain only the first and second sensing elements.

According to the invention there is further provided a reader for reading printed indicia, for example bar code symbols, comprising a light source for illuminating an indicia and a light detector for producing a signal corresponding to detected light reflected from the indicia, the light detector having a plurality of channels, each channel being associated with a different resolution level of the signal produced by the detector. Thus symbols or indicia at different resolutions can be read quickly and simply by a single reader.

The detector may be arranged to process the signal and transfer a signal processed at a first threshold level via a first channel and a signal processed at a second resolution level via a second channel.

Alternatively the light source may be arranged to generate a first illuminating beam at a first resolution and a second illuminating beam at a second resolution, the first and second illuminating beams being spatially separated, and the detector may comprise a first region associated with a first channel for producing a signal corresponding to the first beam and a second region associated with a second channel for producing a signal corresponding to the second beam.

The light source may be arranged to generate a first and second illuminating beam spaced laterally from one another and the detecting regions of the detector corresponding to the first and second beams may be laterally spaced from one another. Alternatively the light source is arranged to generate concentric first and second illuminating beams and the detecting regions of the detector corresponding to the first and second beams may be concentric.

The light source may be arranged to generate a light beam of a first resolution at a first wavelength and a light beam of a second resolution at a second wavelength, and the detector may be arranged to detect light of the first wavelength and produce a signal corresponding to the first light beam at a first channel and to detect light of the second wavelength and produce a signal corresponding to the light of the second wavelength at a second channel.

The light source may be arranged to generate a light beam at a first resolution in a first set of pulses and a light beam at a second resolution in a second set of pulses temporally off-set from the first set of pulses, and the detector may be synchronised with the light source to detect light pulses of the first resolution and produce corresponding signals at a first channel and to detect the light pulses of the second resolution and produce corresponding signals at a second channel.

The reader may comprise a flying spot scanning reader or a field of view optical reader. A decoder may be arranged to analyse the signal from a channel to determine whether it is a valid signal and arranged to merge the signals from each channel if no valid signal from an individual channel is detected.

According to the invention there is further provided a reader for reading printed indicia comprising a light source for illuminating an indicia and a light detector for detecting light reflected from the indicia wherein the detector comprises a first region and a second region for detecting reflected light at a first resolution level and a second resolution level respectively, a first channel being associated with the first region and a second channel being associated with the second region.

According to the invention there is further provided a method of operation of a reader for reading printed indicia comprising a light source for illuminating the indicia and a light detector producing a signal corresponding to detected light reflected from the indicia, a first channel and a second channel being associated with the detector for carrying respective signals at different resolution levels, and a decoder; the method including the steps of decoding the signal from the first channel and, if that signal is not valid, decoding the signal from the second channel and, if that is not valid, merging the signals from the first and second channels, decoding the merged signal and selecting the valid portions of the merged signal.

According to the invention there is further provided a reader for reading printed indicia such as bar code symbols comprising a light source for illuminating an indicia and a detector for producing a signal corresponding to detected light reflected from the indicia, a first channel and a second channel being arranged to receive signals processed by the detector wherein the second channel includes buffer means for delaying a signal and merging the signal with a subsequent signal transferred by the first channel. As a result, the signal portion is enhanced and the noise portion reduced giving rise to an improved signal to noise ratio.

An indicia may be scanned at intervals T giving rise to a signal to the first and second channels via the detector, and the buffer means of the second channel may be arranged to delay the signal for the period T in order to merge the signal with the subsequent signal transferred by the first channel.

According to the invention there is further provided a method of processing analog signals corresponding to a light beam reflected from a printed indicia including receiving the light beam at a detector, converting the light beam to a digital signal and transferring the digital signal via a first channel to a decoder, transferring the digital signal from the detector via a second channel to a delay buffer and merging the delayed signal with a subsequent signal transferred by the first channel.

According to the invention there is further provided a method of decoding a bar code symbol composed of elements of different reflectivity comprising scanning the bar code symbol with a light beam, detecting the reflected light beam and providing a digitized signal carrying the bar code information, wherein the decoder compares the width of each element of a first reflectivity with the width of another element of that reflectivity in the bar code symbol and identifies the element as a defect if its width is less than a predetermined proportion of the width of the other element. As result, defects in a printed bar code symbol, for example because of defectively printed dark regions, may be detected.

The predetermined proportion may be 60%.

If the element is identified as a defect its width may be added to the width of the elements on either side of the element. It is thus possible to determine the width, for example, of a bar, if the intermediate element is a space.

The element may be compared with neighbouring elements of the same reflectivity.

According to the invention there is further provided a processor for processing an optical signal received from a printed indicia, the processor including a detector, a first channel and a second channel associated with a detector and a decoder wherein the channels are arranged to transfer signals at different resolution levels from the detector to the decoder.

BRIEF DESCRIPTION OF THE DRAWINGS

The foregoing objects and advantages of the present invention may be more readily understood by one skilled in the art with reference being had to the following detailed description of several preferred embodiments thereof, taken in conjunction with the accompanying drawings wherein like elements are designated by identical reference numerals throughout several views, and in which:

FIG. 1 illustrates a typical bar code reader. The reader comprises a hand-held laser scanner, generally indicated at 700, having a main body 535 including a graspable hand portion 536 which carries a trigger 539.

Figure 1:
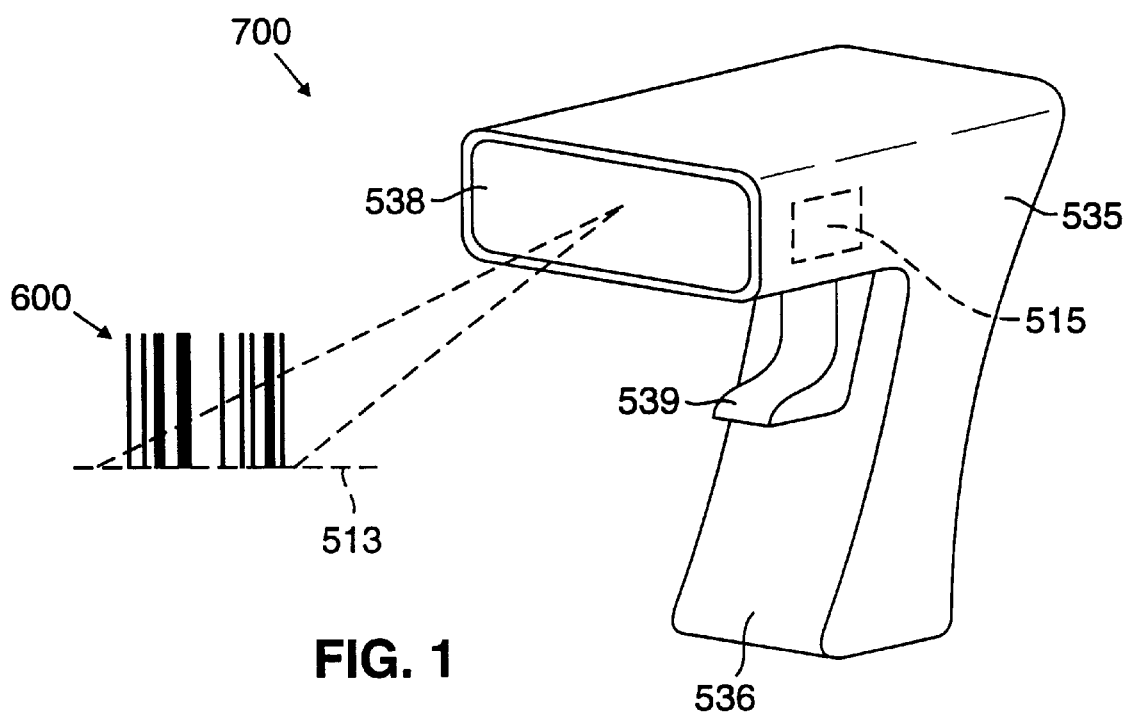
FIG. 1 is a perspective view of a conventional scanner.

Within the body 535 is a laser module 515 (not shown in detail). Light from the laser module 515 is arranged to shine onto an oscillating mirror provided in the body 535. The resultant reflected beam passes through a lens, and out of the housing via a window 538. The mirror is arranged to oscillate in such a way that the beam traces out a scan line 513 across a bar code 600 to be recorded. In the example shown in FIG. 1, the bar code 600 is a linear bar code, but it will of course be appreciated that the scanner could instead be arranged to read two-dimensional bar codes: in such a case the mirror would be controlled to produce a raster scan rather than a single line scan.

Light reflected back from the bar code 600 passes through the window 538, is collected by a collecting mirror, from where it is reflected back to a photodetector. The optical signal is then converted into an electrical signal, and the features of the bar code symbol 600 determined.

The arrangements discussed below may be included in such a reader or in any other type of reader, for example a laser wand reader, a fixed reader and either flying spot or field of view readers.

The print quality and print density of indicia to be read, for example bar code symbols, varies widely. For example, low resolution bar code symbols may comprise relatively wide bars printed in dot matrix format whereas high density symbols will comprise bars or elements that are relatively small in dimension. Accordingly a bar code reader that generates a scanning spot that is relatively broad and thus suitable for reading low density bar code symbols may not be appropriate for reading high density symbols as the broad spot will encompass more than one element and group them together as a single element. Conversely, a bar code reader that generates a very narrow spot suitable for reading high density indicia may not be suitable for low density indicia printed in dot matrix format as the dimensions of the small spot may be similar to the dimensions of the individual dots and spaces in the dot matrix format as a result of which a single bar comprising a plurality of columns of dots may be read as a large number of narrow elements. The problem is exacerbated further if the reading beam is incident on the symbol at an angle to the normal as the reading spot will be correspondingly spread out leading to further problems with resolution.

Figure 2A:
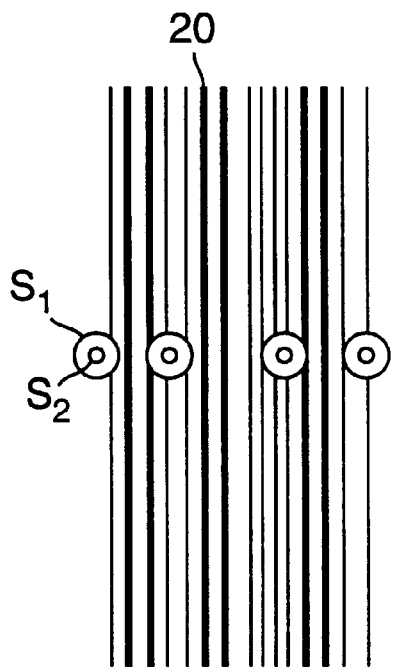
FIG. 2a illustrates scanning of sensing spots across a bar code symbol.

To illustrate the situation, FIG. 2a shows scanning of the spots $S_1$ and $S_2$ across a bar code 20, for a relatively small working angle 0°. The user keeps the working angle close to or equal to 0° throughout the length of the scan, and the spots $S_1$ and $S_2$ both remain essentially circular.

Scanning of the spots $S_1$ and $S_2$ is shown across a relatively high density bar code 20. At several points of the scan of the high density bar code, particularly at the middle two positions illustrated in the drawing, the larger sensing spot $S_1$ covers two or more elements. The averaging over such an area would not provide an accurate signal indicating the edges of the small bar code elements. The smaller diameter spot $S_2$, however, covers so small an area that even at these positions it covers only one narrow element and thus provides an accurate reading.

Figure 2B:
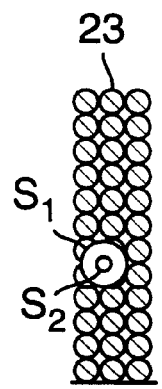
FIG. 2b illustrates scanning of sensing spots across a dot matrix symbol.

FIG. 2b illustrates scanning of the spots $S_1$ and $S_2$ over one element 23 of a dot matrix bar code. As shown, the element 23 actually exhibits gaps between the individual dots. Sensing using the small spot $S_2$ will detect the dots as dark areas and the taps as light regions. For example, at the position shown in FIG. 3b, the spot $S_2$ coincides approximately with one of the gaps. As a result, the signal responsive to sensing of spot $S_2$ would, at that point indicate a light space, not a dark bar element. Thus sensing of the spot $S_2$ would not accurately read the width of the element 23. The larger spot $S_1$, however, should produce a legitimate decode result. Sensing using spot $S_1$ averages the reflected light over the larger area of that spot, and consequently would indicate a dark element, providing an accurate reading.

In order to address the problem of varying the resolution two reading spots are provided of different resolutions and are read by correspondingly configured detectors wherein the detectors include more than one channel, each channel corresponding to reading the indicia at the different resolutions. Alternatively a single spot is provided, appropriate portions being read by the detector to provide reading at the desired different resolution levels, and channels being provided corresponding to the different resolutions. It will be seen that the common feature is that the system provides two data streams from the two different resolution channels, for example to a single decoder which can be common to the different alternatives.

Figure 3:
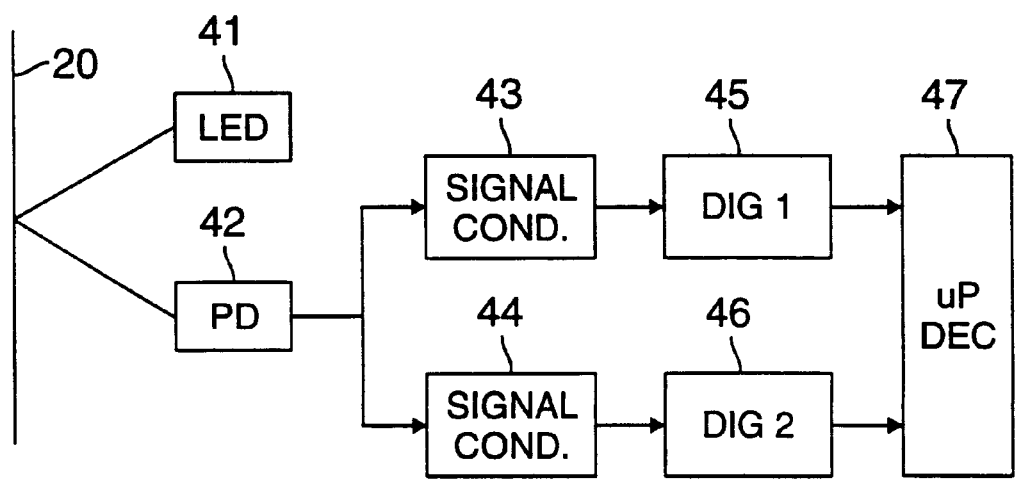
FIG. 3 is a block circuit diagram of an embodiment of the invention.

For example, the embodiment of FIG. 3 has a single light source, light emitting diode or "LED" 41, and a single photodetector, photodiode "PD" 42. The LED 41 emits light to illuminate an area of the surface of the optically encoded information, i.e. bar code symbol 20.

The PD 42 senses light reflected from bar code symbol 20 and produces an analog signal the amplitude of which represents the amplitude of reflected light. The reader scans the bar code symbol 20. If the reader is a wand, the user manually passes the unit over the information such that the detected reflected light varies in amplitude in correspondence with the light and dark regions of the information.

The analog signal from PD 42 is amplified, inverted and conditioned by two analog signal conditioning circuits 43 and 44. The signal conditioning circuits 43 and 44 are essentially identical and thus provide two analog signals as output signals. One of these output signals goes to a first digitizer 45, the other to second digitizer 46. The digitizers 45 and 46 serve as edge detectors or wave shaper circuits, in a manner similar to digitizers used in prior art single channel type readers. In each of the digitizers 45 and 46, the threshold value set by the digitizer determines what points of the analog signal represent bar edges. The digitizers 45 and 46, however, have different threshold values.

The pulse signals output from both of the digitizers 45 and 46 are supplied as inputs to a programmed microprocessor type decoder 47. Signal conditioning circuit 43 and digitizer 45 from a first channel providing a first data stream to the decoder 47. Signal conditioning circuit 44 and digitizer 46 form a second channel providing a second data stream to the decoder 47. The threshold of the first digitizer 43 is set relatively low that is, it is set to detect only substantial variations in the amplitude of the analog signal so that digitizer 43 will have a low resolution. The second digitizer 46 has a high threshold set to detect minor amplitude variations and is sensitive.

Accordingly for either high resolution bar code symbols or low resolution bar code symbols, one of the two channels will produce a pulse signal output or data stream closely corresponding to the edges of the scanned bar code. The decoder 47 is a relatively standard unit, with the exception that it has two inputs, instead of one, for the two data streams for the two different resolution channels. The integrated decoder 47 provides a digital data output, for example in ASCII format.

Figure 4:
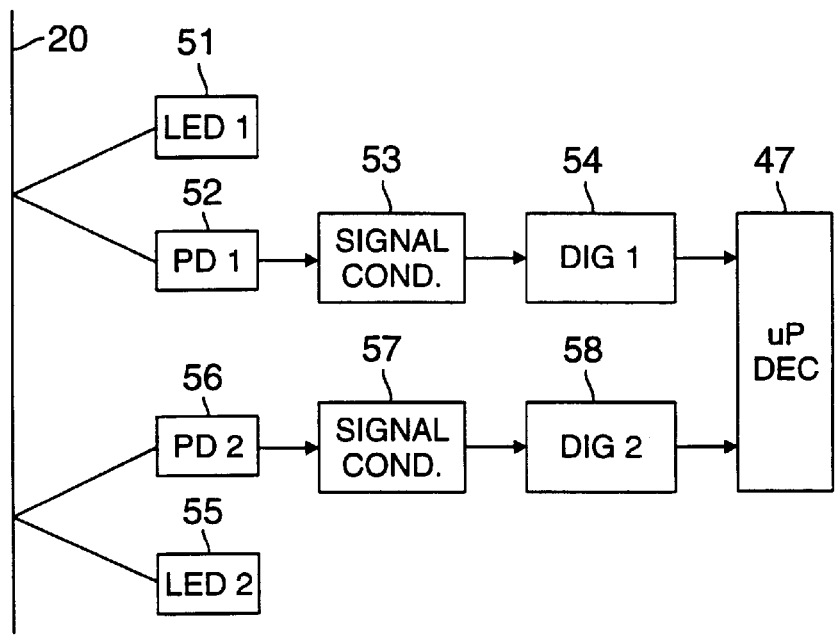
FIG. 4 is a block circuit diagram of an alternative embodiment of the invention.

The embodiment of FIG. 4 produces two different channels optically. This embodiment includes two emitters and two detectors. A first LED 51 emits light which illuminates a spot on the bar code 20. The light emitted from LED 51 is reflected back by the bar code and detected by a first PD 52. A signal conditioning circuit 53 and first digitizer 54 provide a low resolution data stream for output as a pulse train signal to decoder 47. A second LED 55 emits light which illuminates a second spot on the bar code 20. The light emitted from LED 55 is reflected back by the bar code and detected by a second PD 56. A second signal conditioning circuit 57 and second digitizer 58 provide a low resolution data stream for output as a pulse train signal to decoder 47.

As illustrated in FIG. 4, emitters and detectors are arranged so that the two spots are slightly spaced apart. This is called spatial multiplexing. If it were desired to have the two spots concentric, other forms of multiplexing could be used. For example, LED's 51 and 55 could emit different wavelengths of light, and the associated PD's 52 and 56 would be designed and/or have associated light filters so as to detect only the light from the corresponding detector.

LED 51, PD 52, signal conditioning circuit 53 and digitizer 54 form the low resolution channel. LED 55, PD 56, signal conditioning circuit 57 and digitizer 58 form the high resolution channel. In this embodiment, the resolution and spot size of each channel is set by the characteristics of the LED, the PD, the associated optics, or any apertures associated therewith. For example, optics can focus light from each LED to form a different size illuminated spot and/or at a different distance form the tip of the want. Alternatively, the size of the PD's can vary or each can have a different aperture to establish a different area over which to average the reflected light. The digitizers 54 and 58 may have the same threshold value, but preferably, the thresholds are set to correspond to the characteristics of the LED's, PD's and optics of their respective channel.

Figure 5:
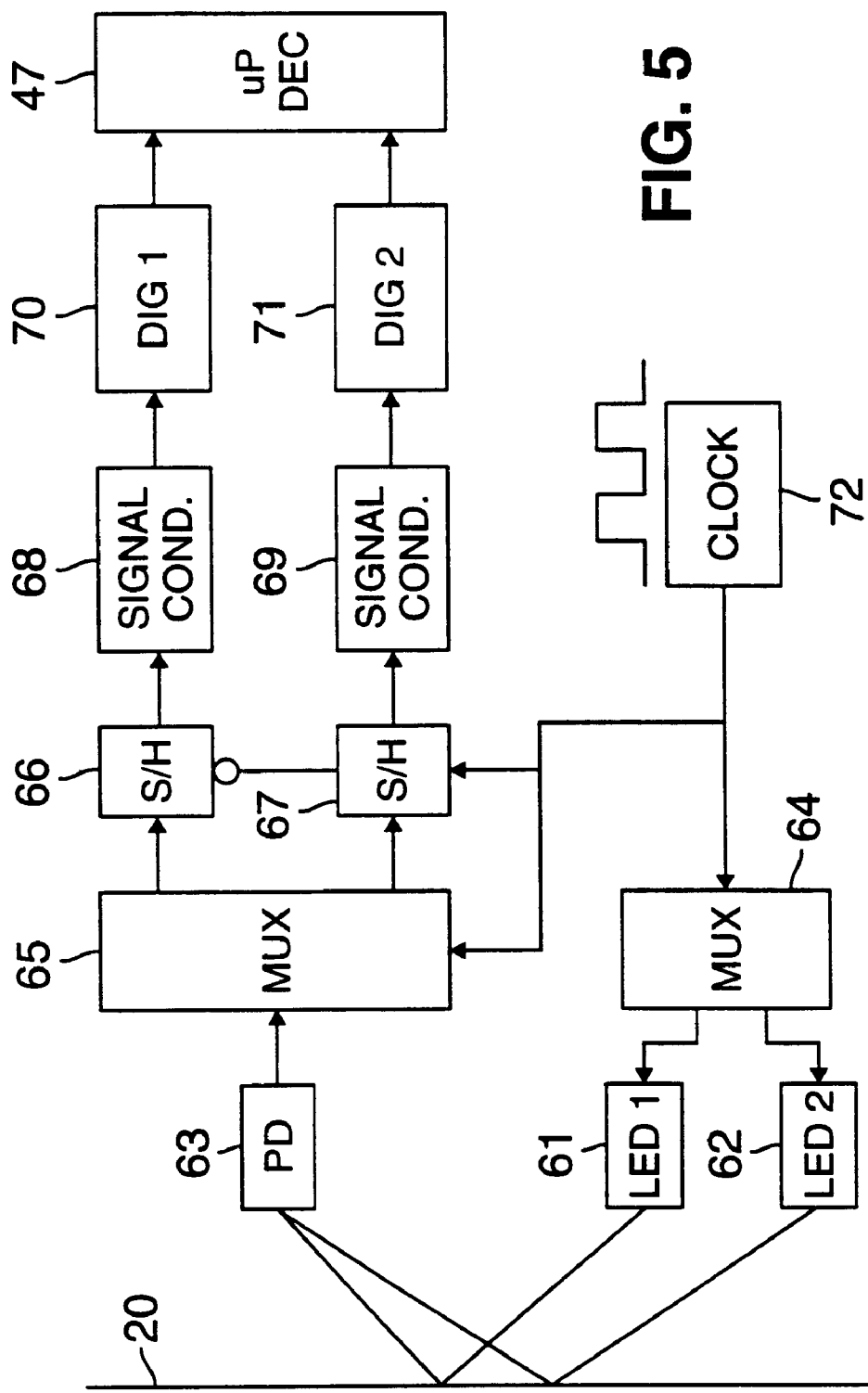
FIG. 5 is a block circuit diagram of an alternative embodiment of the invention.

A further variant shown in FIG. 5 uses two emitters and one detector. The output of the detector is multiplexed in synchronism with pulsing of the individual emitters to produce the two channels. The emitters and/or the associated optics differ to provide the two different effective sensing spots and the two different resolutions. The two spots can be closely aligned or substantially concentric on the surface of the optical information 20. The high and low resolution signals are time division multiplexed by the pulsing of the individual LED's.

The embodiment includes two LED's 61 and 62, but only one PD 63. A multiplexer 64 alternately activates LED's 61 and 62. A multiplexer 65 alternately provides the output of PD 63 to one of two sample and hold (S/H) circuits 66 and 67. The signal conditioning circuit 68 and digitizer 70 provide the pulse signal and the low resolution channel to the decoder 47. The signal conditioning circuit 69 and digitizer 71 provide the pulse signal for the high resolution channel to the decoder 47. A clock 72 provides the appropriate timing signals to the two multiplexers 64 and 65 and the S/H circuits 66 and 67. Multiplexing can also be performed by rapidly pulsing the two LED's at two different frequencies and performing frequency demodulation.

The LED 61 and its associated optics are designed to provide a relatively large illuminated spot, and the LED 62 and its associated optics are designed to provide a relatively small illuminated spot. The signal from clock 72 drives the multiplexer 64 to trigger LED 61 and multiplexer 65 to provide the signal from PD 63 to S/H circuit 66. S/H circuit 66 holds a sample of the low resolution analog signal produced by the LED 61 and PD 63. The signal from clock 72 then drives the multiplexer 64 to trigger LED 62 and multiplexer 65 to provide the signal from PD 63 to S/H circuit 67. S/H circuit 67 holds a sample of the high resolution analog signal produced by the LED 62 and PD 63. As this cycle repeats the S/H circuits 66 and 67 will successively hold samples of the two different resolution analog signals.

The conditioning circuits and digitizers will then provide the two differing resolution data streams to the decoder 47. The signal conditioning circuits 68 and 69 and the digitizers 70 and 71 correspond closely to those of the preceding embodiment.

The optics of the reader may comprise a system constructed by combining two half-axicons each of which establishes a different depth of field and spot size so as to provide the two different resolutions with the two channels.

Figure 6:
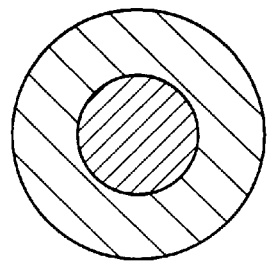
FIG. 6 is a simplified plan view of a detector having two active areas.

FIG. 6 is a simplified plan view of a photodetector having two active areas, one surrounding the other, with Active area #1 shown as a shaded central circle and Active area #2 shown as a cross-hatched surrounding area. The structure of the photodetector of this embodiment will be discussed in more detail below with regard to FIGS. 7 and 8. The salient feature of the photodetector is that it inherently forms a multi-channel detection system. This multi-channel photodetector comprises a first active optical sensing area on a substrate and a second active optical sensing area formed on the same substrate. The second optical sensing area is located around said first optical sensing area. Each active optical sensing area, together with the underlying substrate forms, a photodiode. The photodetector is used in the embodiment of the invention shown in FIG. 9.

Figure 9:
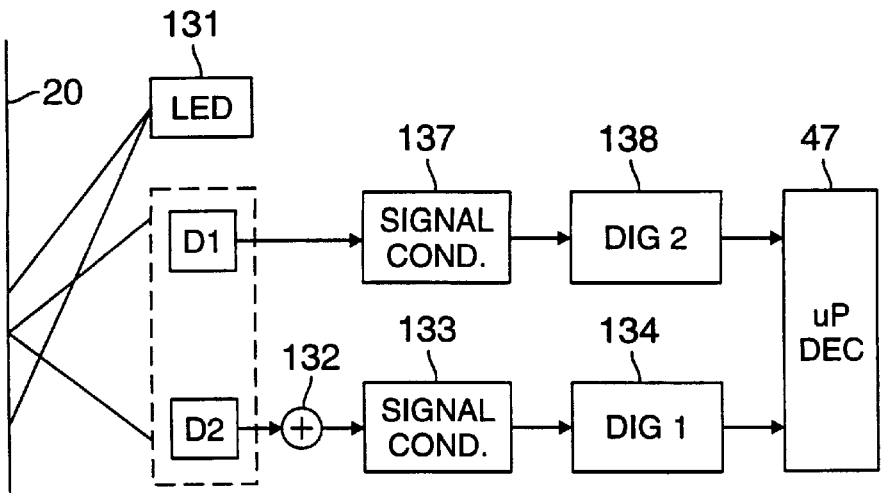
FIG. 9 is a block circuit diagram for the invention including the detector of FIG. 6.

In the circuit of FIG. 9, the signal conditioning circuits and the digitizers function in a manner similar to those in the embodiments of FIGS. 4 and 5. The only different is that FIG. 9 shows the high resolution channel, including the second digitizer, as the upper channel and the first channel as the lower channel.

In this embodiment, there is one light emitting element and two photodetectors, and the photodetectors comprise the active sensing areas of the unit shown in FIG. 6. In FIG. 9, D1 represents the sensor or photodetector including Active area #1, the central active area. D2 represents the sensor or photodetector including Active area #1, the surrounding active area. The LED 131 emits light to illuminate the optically encoded information. The photodetectors D1 and D2 receive light reflected from the surface of the bar code 20.

Detector D1 will produce an analog signal which effectively represents the average of reflected light received over the small Active area D1. This signal would be the same as if a photodiode of a small effective area were used, and the effective area established the spot size and/or resolution of the high resolution channel.

Detector D2 will produce an analog signal which effectively represents the average of reflected light received over the larger surrounding Active area D1. The analog signals from D1 and D2 are summed by adding circuit 132. The sum of the analog signals from D1 and D2 closely approximates the signal which a larger photodiode would produce, i.e. by averaging received light over the total active area of area #1 plus area #2.

Signal conditioning circuit 133 receives the summed signal from adder 132 and conditions it as discussed above. The signal from conditioning circuit 133 is digitized by digitizer 134 to form the low resolution data stream. Detectors D1 and D2, adder 132, signal conditioning circuit 133 and first digitizer 134 thus form the low resolution first channel in this embodiment. Signal conditioning circuit 137 receives the signal from D1 and conditions it as discussed above. The signal from conditioning circuit 137 is digitized by digitizer 138 to form the high resolution data stream. Detector D1, signal conditioning circuit 137 and second digitizer 138 thus form the high resolution second channel in this embodiment. Decoder 47 receives and processes the pulse signals from digitizers 134 and 138 in the same manner as in the earlier discussed embodiments.

It would be a simple matter to increase the number of channels of different resolutions derived using the photodetector unit of FIG. 9 by adding additional surrounding areas and corresponding adders, signal conditioning circuits and digitizers. Alternatively, two active areas could be used and the two LED's in the sensing assembly pulsed,in a manner similar to that of the circuit of FIG. 5.

The photodetector unit of FIG. 9 would be fabricated using relatively standard photodiode manufacturing technology. In particular, the manufacturing processes are similar to those used to build side by side photodiodes and quad four photodiode type devices. Inactive areas or dead zones between active devices typically range in size from 0.001 to 0.005. Possible layouts for the photodetector unit of FIG. 9 appear in FIGS. 7 and 8.

Figure 7:
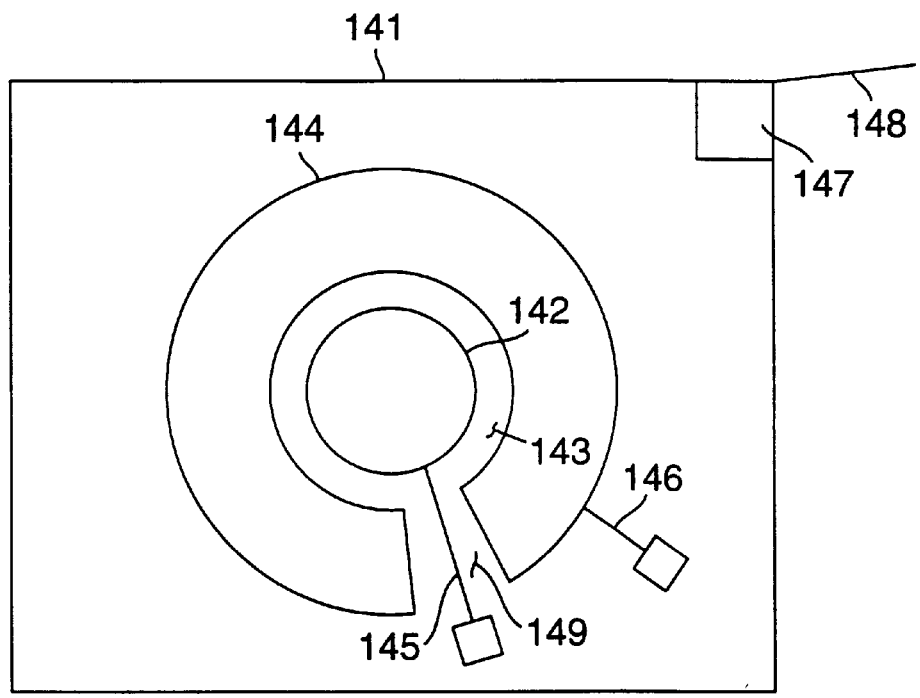
FIG. 7 is a more detailed view of the detector of FIG. 6.

The embodiment of FIG. 7 includes a substrate 141 on which the active areas are formed. The first active area 142 is circular. The first active region 142 is formed by appropriately doping the circular region. A dead zone 143 surrounds the active area 142. The second active area 144 forms a substantially circular ring around the first active area 142 and dead zone 143. The second active region 144 is formed by appropriately doping the circular ring. The dead zone 143 separates and electrically isolates active areas 142 and 144. A common lead 148 is attached to substrate 141 by bonding pad 147. Together with the underlying substrate, each of the active regions 142 and 144 forms a photo sensitive diode.

FIG. 7 illustrates the preferred form of connection to the first active area 142. In this embodiment, the second active area 144 does not form a complete ring around the first active area 142. A small inactive area 149 forms an insulating passage through the ring formed by the second active area 144. A metal trace 145 formed on the small inactive area 149 connects the first active area to a bonding pad. Current carrying connection to the first active area can then be formed through the bonding pad and the metal trace 145. A metal trace 146 similarly connects second active area 144 to a bonding pad. Only a 2 mil wide path through the second active area 144 is lost to formation of the passage 149 and trace 145.

Figure 8:
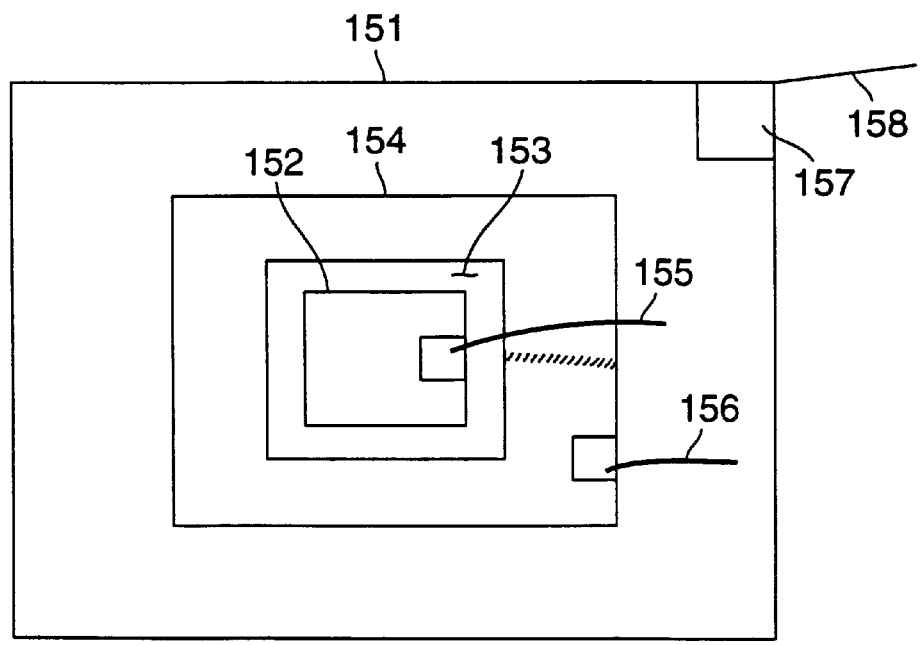
FIG. 8 is a more detailed view of an alternative detector of FIG. 6.

FIG. 8 illustrates a second embodiment of the inventive photodetector unit, having rectangular active areas using a bonding pad formed directly on each of the active areas. This embodiment includes a substrate 151 on which the active areas are formed. The first active area 152 is rectangular, and the first active region 152 is formed by appropriately doping the rectangular region. A rectangular dead zone 153 is formed around the active area 152. The second rectangular active area 154 completely encloses the first active area 152 and dead zone 153. The second active region 154 is formed by appropriately doping the outer rectangular ring. The dead zone 153 separates and electrically isolates active areas 152 and 154. A common lead 158 is attached to substrate 151 by bonding pad 157. Together with the underlying substrate, each of the active regions 152 and 154 forms a photo sensitive diode.

FIG. 8 illustrates a second form of connection to the active areas. In this embodiment, a bonding pad is formed directly on each active area. A metal lead 155 provides current carrying connection to the first active area 152 through the bonding pad on that area, and a second metal lead 156 provides a similar connection through the bonding pad on the second active area 154. In each active area a portion of the area is sacrificed to formation of the bonding pads. Also, the lead 155 will cast a shadow across the second active area 154, as shown in FIG. 8.

Other active area type photodetector devices could be used. For example, it is contemplated that the photodetector unit could comprise areas within a two dimensional charge coupled device (CCD) array. The central area would comprise a number of pixel sensing units of the array, for example, in the form of a 2×2 square sub-array. The surrounding active area would comprise a number of pixel sensing units of the area around the central active area, for example, forming a 2 pixel wide ring around the square central active area. The signal from the central area would be formed by shifting out the charge value of each pixel of the 2×2 square sub-array and averaging the values over the number of pixels of the central area. The signal from the surrounding area could be formed in a similar manner, or the summation signal could be formed directly by averaging values over both areas together.

In operation of a reader including two channels carrying data streams of differing resolution, the data from both channels is read into a decoder. One of the data streams is chosen for decoding, and if the decoder is successful an indicator such as a beep proceeds an output of the decoded data. If the decoder is unsuccessful the other data stream is decoded and, if successful the decoded data is output. If neither decode is successful then the signals can be merged, the decoder recognising which portions of the data from each channel are acceptable and combining the acceptable portions to form a single final valid read result.

Because of the provision of more than one channel at the photodetector, the signals of different resolutions can be separated out to respective channels allowing decoding of either the high resolution, the low resolution, or a merged combined signal. Although specific embodiments of light generating and light detecting elements have been described above it will be appreciated that variations of those embodiments may be arrived at which will cooperate successfully with the multi-channel photodetector arrangement.

It will be appreciated that the decoder discussed above would also include appropriate software to allow autodiscrimination and capable of distinguishing between light reflected from the indicia to be read and undesirable accidental reflections from other objects in the vicinity.

The multi-channel detector arrangement may also be used in conjunction with devices capable of reading indicia at various distances from the reader using, for example, differently configured reflective surfaces and focusing lenses, whereby one channel is associated with the reading taken at a first distance and a second channel is associated with the reading taken at a second distance. Once again the outputs from the respective channels can be decoded to establish which gives an acceptable read and may be merged, if necessary, in the manner discussed above.

A further application for multi-channel optical detectors may be found in methods of improving the signal to noise ratio when reading printed indicia such as bar code symbols. The portion of the analog signal corresponding to the bar code information is much more regularly distributed than the overlying electronic noise as the major noises such as ambient noise, voltage or current amplifier noise at the front end are white noise. The invention thus provides improved signal to noise ratio by applying multi-channel time averaging to the incoming analog signal in order to enhance the useful signal whilst depressing noise in order that the signal to noise ratio can be significantly increased.

Figure 10:
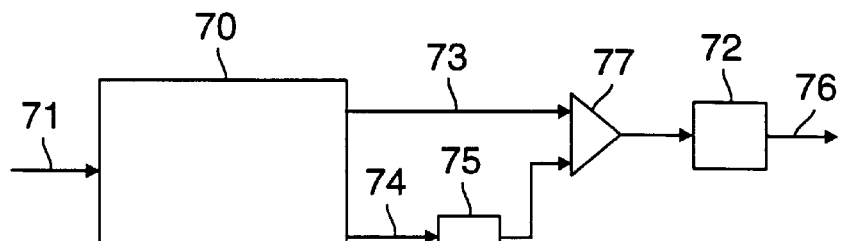
FIG. 10 is a block diagram of a circuit according to another aspect of the invention.

Operation of the system may be viewed in the block diagram of FIG. 10. The time averaging is carried out using a two channel processing unit 70. An incident light beam 71 (analog signal) reflected from an indicia to be read is received by the unit 70 and transferred to a decoder 72 via a first channel 73 and a second channel 74. The incoming signal is digitized and sent to the decoder 72 directly via first channel 73. The signal is also digitized at unit 70 and sent to the decoder via the second channel 74 but a delay is induced (the second channel is called a buffer channel accordingly), as the analog signal is buffered in buffer 75 associated with a second channel 74 with needed bit resolution. Generally a buffer 75 having 5K memory is sufficient. The buffered signal then joins at summing element 77 the conventional first channel 73 signal which has proceeded from the next received incoming analog signal. As a result the useful signal containing bar code information is enhanced whilst the noises are time averaged out. The signal having a higher signal to noise ratio is then sent to the decoder 72 and transferred from the decoder to appropriate processing means by via line 76.

Figure 11:
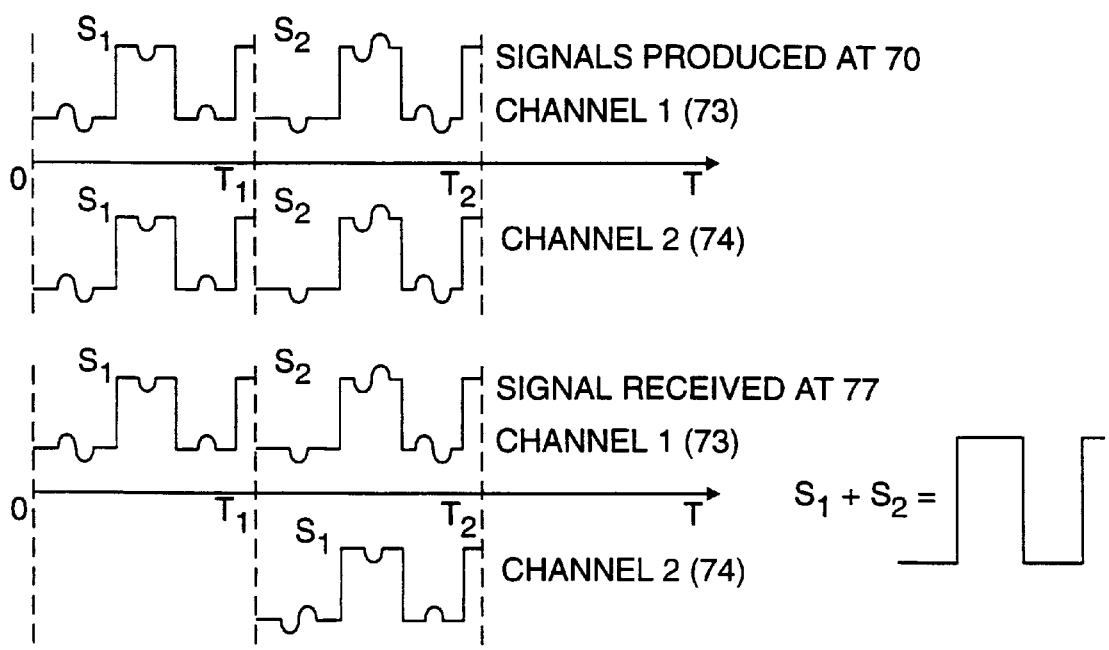
FIG. 11 illustrates operation of the arrangement shown in FIG. 10.

The operation of the system can be understood in more detail from FIG. 11. When the arrangement shown in FIG. 10 is incorporated in a reader such as that shown in FIG. 1, the bar code symbol being scanned is read repeatedly, giving rise to analog signals $S_1,S_2$ at time intervals T1, T2 etc. The analog signals $S_1,S_2$ may be in the form of pulse signals of effectively zeros and ones representing bars and spaces or vice versa. The profile of the pulse signal is, however, distorted by noise. Successive signals $S_1,S_2$ at time T1 and T2 at processing unit 70 are shown on channels 73 and 74. The signal $S_1$ on line 74 is delayed by buffer 75 prior to arrival at summing element 77 such that it is synchronised with signal $S_2$ on line 73. The signals $S_1,S_2$ are then summed at summing element 77 as a result of which the coarse pulse profile relating to the bars and spaces is enhanced whereas the white noise is time averaged and suppressed.

According to another aspect of the invention further improvements to the reading of indicia and in particular bar code symbols printed in dot matrix format are arrived at. Most of the time, failure to decode a dot matrix symbol is caused by a split in a wide bar such that a void in the bar causes a narrow "white" element to appear in the middle of the bar (corresponding splitting of wide or narrow spaces have not, however, been found). Known digitizers are programmed when encountering a void causing a split in the wide element to record a white bar and then record a black bar beginning at the edge of the void, finally switching to a white bar when the true trailing edge of the bar is detected. Accordingly, data indicating where the real trailing edge of the bar is located is retained but the situation could be improved if a distinction could be made between black to white transitions causes by defects and black to white transitions caused by real bar edges. In that case the symbol could be decoded even in the presence of false white elements occurring as a result of defects.

Research, however, shows that although the size of false white elements caused by defects occurring within wide bars varies those elements have not been found to have width any more than 60% of the width of neighbouring true white elements. Generally the false elements are less than 50% of the size of true neighbouring white elements.

Figure 12:
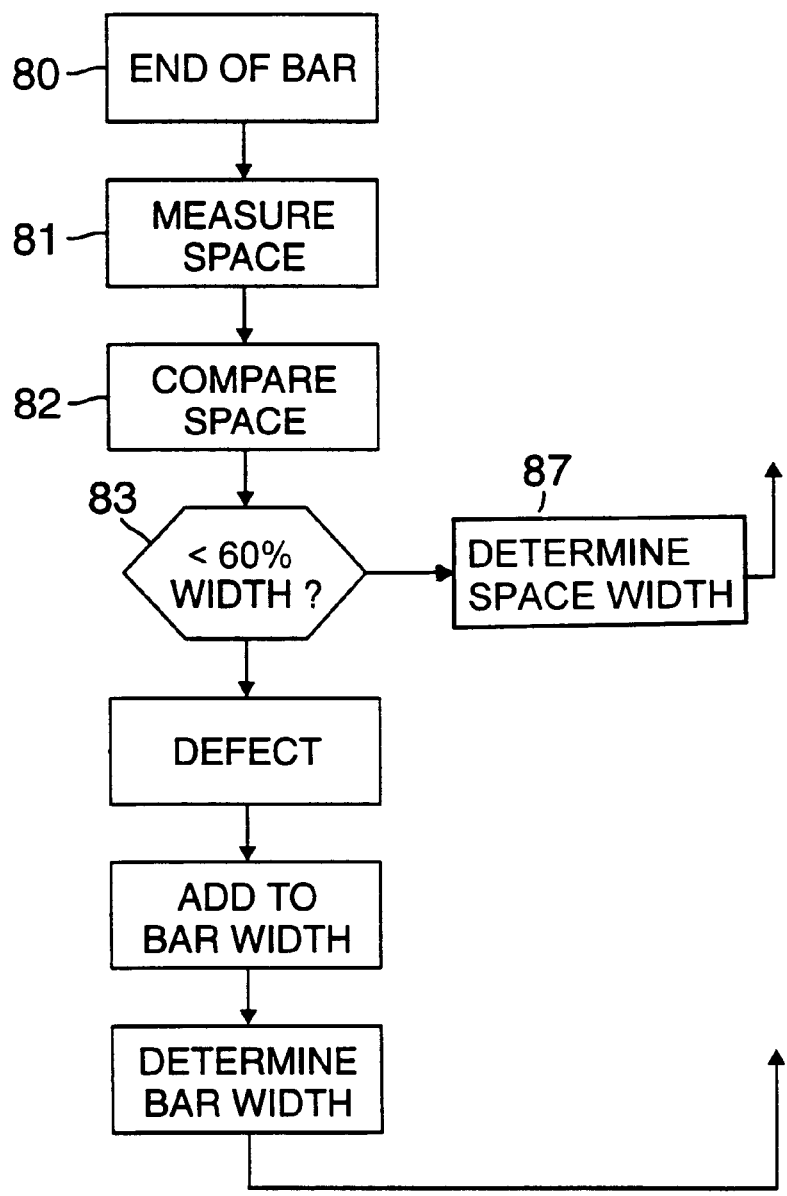
FIG. 12 is a flow chart illustrating operation of a system according to a further aspect of the invention.

A solution to the problem is described with reference to the flow chart of FIG. 12. In effect the decoder is programmed to differentiate between white elements causes by defects and white elements caused by true spaces between bars and the symbol by comparing the size of a white element with its neighbouring white elements. Referring to the flow chart, a trailing edge of a black element is first detected 80 (end of bar) the width of the white element which may either be a true space between bars or a defect is then scanned 81 (measure space). The decoder then accesses a memory store in which it has stored information relating to the width of white elements in previous steps. In particular the memory stores information relating to the width of neighbouring white elements. The width of the current white element is then compared with the stored width 82 and if the width of the current element is less than 60% [83] of the stored width value then it is identified as a defect 84. In that case the decoder adds the width of the false white element to the width of the black bar elements on either side 85 (add to bar width) and the true bar width is thus determined. If at step 83 the white element has a width greater than 60% of the stored width then it is identified as a true space 87 (determined space width) having the width determined in step 81. In either case, operation then continues as normal.

Generally the memory need only store information as to the width of the previous character which, if decoded and identified as a true space will act as a sufficient template for comparison with the subsequent space width.

Generally to assist in identifying the width of true white elements a start character of predetermined width is provided which is recognised by the decoder as a model true width and can be used as a basis for later comparisons. Defects may occur even in the start character, however, in which case if an initial value of a valid space (start character) cannot be found owing to defects in the printing of the wide elements in the start character, decoding may be carried out by scanning in the opposite direction, that is from the other end of the symbol.

In order to enhance the process, the decoder may be pre-programmed with information relating to the true space widths of the symbols to be decoded although this must, of course, be normalised with regard to the distance of the reader from the symbol to be read. Alternatively, suitable algorithms may be introduced to assist the decoder in initially setting values for valid space widths, for example the decoder may establish a table of detected space widths and deduce the narrowest valid space width based on the 40% size gap between the narrowest valid space and the widest invalid space. Although, generally such additional steps would not be required it will be seen that in exceptional circumstances where more than one false space is found in a single bar this would not present a problem to the modified type decoder.

The bar code may be detected by a field of view CCD array in which case the relative physical sizes of the bar spaces can be compared. Alternatively the bar code can be scanned by a laser or light spot. In that case, as the scanning will generally take place at a constant rate, the relative sizes of bars and spaces can be determined from the period of time detected between the leading and trailing edges of bars or spaces. The process discussed above can be further modified in various ways. For example any space more than approximately 50 microseconds scanning duration can generally be assumed to be a reject because in reality no elements are that small. Small defect rejection can be combined with ASCII stitching (combining of partial scans to form a complete scan), half-block decode (combining of separately acquired halves of the symbol) or distance decode. It may be found in scanning a batch of symbols printed during the same process that different rejection thresholds are appropriate, for example 40% or 50% of neighbouring elements. The algorithm within a decoder may be arranged to vary the rejection threshold based on a record of the compared ratios of false and true white elements.

Without further analysis, the foregoing will so fully reveal the gist of the present invention that others can readily adapt to various applications without omitting features that, from the standpoint of prior art, fairly constitute essential characteristics of the generic or specific aspects of the invention and, therefore, such adaptions should and are intended to be compounded within the meaning and range of equivalents of the following claims.

What is claimed is:

1. A reader for reading printed indicia, comprising:
a light source for illuminating an indicia having indicia details, and
a light detector for producing a signal corresponding to detected light reflected from the indicia, the light detector having a plurality of channels, each channel being associated with a different resolution level of the signal produced by the detector, wherein each resolution level corresponds to a different range of sizes of indicia details representable in the signal.

2. A reader as claimed in claim 1 in which the detector is arranged to process the signal and transfer a signal processed at a first resolution level via a first channel and a signal processed at a second resolution level via a second channel.

3. A reader as claimed in claim 1 in which the light source is arranged to generate a first illuminating beam at a first resolution and a second illuminating beam at a second resolution, the first and second illuminating beams being spatially separated, and the detector comprises a first region associated with a first channel for producing a signal corresponding to the first beam and a second region associated with a second channel for producing a signal corresponding to the second beam.

4. A reader as claimed in claim 3 in which the light source is arranged to generate a first and second illuminating beam spaced laterally from one another.

5. A reader as claimed in claim 4 in which the first and second regions of the detector are laterally spaced from one another.

6. A reader as claimed in claim 3 in which the light source is arranged to generate concentric first and second illuminating beams.

7. A reader as claimed in claim 6 in which the first and second regions of the detector corresponding to the first and second beams are concentric.

8. A reader as claimed in claim 1 in which the light source is arranged to generate a light beam of a first resolution at a first wavelength and a light beam of a second resolution at a second wavelength.

9. A reader as claimed in claim 8 in which the detector is arranged to detect light of the first wavelength and produce a signal corresponding to the first light beam at a first channel and to detect light of the second wavelength and produce a signal corresponding to the light of the second wavelength at a second channel.

10. A reader as claimed in claim 1 in which the light source is arranged to generate a light beam at a first resolution in a first set of pulses and a light beam at a second resolution in a second set of pulses temporally off-set from the first set of pulses.

11. A reader as claimed in claim 10 in which the detector is synchronised with the light source to detect light pulses of the first resolution and produce corresponding signals at a first channel and to detect the light pulses of the second resolution and produce corresponding signals at a second channel.

12. A reader as claimed in claim 1 comprising a flying spot scanning reader.

13. A reader as claimed in claim 1 comprising a field of view optical reader.

14. A reader as claimed in claim 1 including a decoder arranged to analyse the signal from a channel to determine whether it is a valid signal.

15. A reader as claimed in claim 14 in which the decoder is arranged to merge the signals from each channel if no valid signal from an individual channel is detected.

16. A method of operation of a reader for reading printed indicia having indicia details, the reader comprising a light source for illuminating the indicia and a light detector producing a signal corresponding to detected light reflected from the indicia, a first channel and a second channel being associated with the detector for carrying respective signals at different resolution levels, and a decoder, wherein each resolution level corresponds to a different range of sizes of indicia details representable in the signal; including the steps of decoding the signal from the first channel and, if that signal is not valid, decoding the signal from the second channel and, if that is not valid, merging the signals from the first and second channels, decoding the merged signal and selecting the valid portions of the merged signal.

17. A reader for reading printed indicia comprising a light source for illuminating an indicia and a detector for producing a signal corresponding to detected light reflected from the indicia, a first channel and a second channel being arranged to receive signals processed by the detector wherein the second channel includes buffer means for delaying a signal and merging the signal with a subsequent signal transferred by the first channel, to produce a time-averaged signal corresponding to detected light reflected from the indicia.

18. A reader as claimed in claim 17 in which an indicia is scanned at intervals T giving rise to a signal to the first and second channels via the detector, and the buffer means of the second channel is arranged to delay the signal for the period T in order to merge the signal with the subsequent signal transferred by the first channel.

19. A method for processing analog signals corresponding to a light beam reflected from a printed indicia including receiving the light beam at a detector, converting the light beam to a digital signal and transferring the digital signal via a first channel to a decoder, transferring the digital signal from the detector via a second channel to a delay buffer and merging the delayed signal with a subsequent signal transferred by the first channel, to produce a time-averaged signal corresponding to detected light reflected from the indicia.

* * * * *